United States Patent
Ogata et al.

(10) Patent No.: US 10,516,148 B2
(45) Date of Patent: Dec. 24, 2019

(54) NONAQUEOUS ELECTROLYTE SECONDARY BATTERY INSULATING POROUS LAYER

(71) Applicant: Sumitomo Chemical Company, Limited, Tokyo (JP)

(72) Inventors: Toshihiko Ogata, Osaka (JP); Junji Suzuki, Niihama (JP); Hiroki Hashiwaki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 150 days.

(21) Appl. No.: 15/593,422

(22) Filed: May 12, 2017

(65) Prior Publication Data
US 2018/0301683 A1 Oct. 18, 2018

(30) Foreign Application Priority Data
Apr. 14, 2017 (JP) ................. 2017-080835

(51) Int. Cl.
*H01M 2/16* (2006.01)
(52) U.S. Cl.
CPC ....... *H01M 2/1686* (2013.01); *H01M 2/1653* (2013.01)
(58) Field of Classification Search
CPC ............. H01M 2/1673; H01M 2/1653; H01M 2/1686; H01M 2/162; H01M 10/052
See application file for complete search history.

(56) References Cited

U.S. PATENT DOCUMENTS

| 2010/0068612 | A1 | 3/2010 | Nishikawa | |
|---|---|---|---|---|
| 2017/0155107 | A1* | 6/2017 | Akiike | H01M 2/16 |
| 2017/0229698 | A1* | 8/2017 | Mizuno | H01M 2/166 |
| 2018/0118570 | A1* | 5/2018 | Takizawa | C01B 25/455 |
| 2018/0212220 | A1* | 7/2018 | Kuratani | H01M 2/1653 |

FOREIGN PATENT DOCUMENTS

| JP | 200921265 A | 1/2009 |
|---|---|---|
| JP | 2009224343 A | 10/2009 |

* cited by examiner

*Primary Examiner* — Muhammad S Siddiquee
(74) *Attorney, Agent, or Firm* — Panitch Schwarze Belisario & Nadel LLP

(57) ABSTRACT

The present invention improves productivity of production of a nonaqueous electrolyte secondary battery. A nonaqueous electrolyte secondary battery insulating porous layer in accordance with an embodiment of the present invention is a constituent member of a nonaqueous electrolyte secondary battery laminated separator, includes a thermoplastic resin, has a porosity of 25% to 80%, and has a peeling strength of above 0 N/m to 2.0 N/m when press-bonded to a nonaqueous electrolyte secondary battery electrode at 25° C. through two one-minute 30 kN applications, the nonaqueous electrolyte secondary battery electrode containing an electrode active material, an electrically conductive agent, and a binding agent in a mass fraction of 92:2.7:5.3.

8 Claims, 2 Drawing Sheets

NONAQUEOUS ELECTROLYTE SECONDARY BATTERY INSULATING POROUS LAYER

This Nonprovisional application claims priority under 35 U.S.C. § 119 on Patent Application No. 2017-080835 filed in Japan on Apr. 14, 2017, the entire contents of which is hereby incorporated by reference.

TECHNICAL FIELD

The present invention relates to (i) an insulating porous layer for a nonaqueous electrolyte secondary battery (hereinafter referred to as a "nonaqueous electrolyte secondary battery insulating porous layer"), (ii) a laminated separator for a nonaqueous electrolyte secondary battery (hereinafter referred to as a "nonaqueous electrolyte secondary battery laminated separator"), (iii) a member for a nonaqueous electrolyte secondary battery (hereinafter referred to as a "nonaqueous electrolyte secondary battery member"), and (iv) a nonaqueous electrolyte secondary battery.

BACKGROUND ART

Nonaqueous electrolyte secondary batteries such as a lithium secondary battery are currently in wide use as (i) batteries for devices such as a personal computer, a mobile telephone, and a portable information terminal or (ii) on-vehicle batteries.

An example of a separator known to be used for such a nonaqueous electrolyte secondary battery is a laminated separator in which a porous layer containing a filler and a resin is disposed on at least one surface of a porous base material containing polyolefin as a main component.

For example, Patent Literature 1 discloses a nonaqueous secondary battery laminated separator in which a heat-resistant porous layer containing a filler and also containing an aramid resin as a main component is disposed on at least one surface of a porous base material. Meanwhile, Patent Literature 2 discloses a nonaqueous secondary battery laminated separator in which a heat-resistant porous layer containing a water-soluble polymer as a binder and also containing a filler as a main component is disposed on at least one surface of a porous base material.

During assembly of a nonaqueous electrolyte secondary battery, an electrode and a separator are press-bonded through a press in order to increase adhesion between the electrode and the separator. A separator, typified by the separator disclosed in Patent Literature 1, in which a porous layer containing a resin as a main component is laminated has high adhesion, but has a drawback of not having a sufficiently high battery characteristic due to its low air permeability. Meanwhile, a separator, typified by the separator disclosed in Patent Literature 2, in which a porous layer containing a filler as a main component is laminated has high air permeability, but has no adhesion to an electrode. This causes misalignment between the electrode and the separator occurs during assembly of a battery and thus deteriorates a battery characteristic.

CITATION LIST

Patent Literature

[Patent Literature 1]
Japanese Patent Application Publication, Tokukai, No. 2009-21265 (Publication Date: Jan. 29, 2009)

[Patent Literature 2]
Japanese Patent Application Publication, Tokukai, No. 2009-224343 (Publication Date: Oct. 1, 2009)

SUMMARY OF INVENTION

Technical Problem

It is an object of the present invention to provide a nonaqueous electrolyte secondary battery insulating porous layer which has adhesion to an electrode when pressed with the electrode at room temperature and also has sufficiently high air permeability.

Solution to Problem

The present invention includes the following [1] through [5]:

[1] A nonaqueous electrolyte secondary battery insulating porous layer for covering an entire area of at least one surface of a porous base material included in a nonaqueous electrolyte secondary battery laminated separator, wherein the nonaqueous electrolyte secondary battery insulating porous layer includes a thermoplastic resin, has a porosity of 25% to 80%, and has a peeling strength of above 0 N/m to 2.0 N/m when press-bonded to a nonaqueous electrolyte secondary battery electrode at 25° C. through two one-minute 30 kN applications, the nonaqueous electrolyte secondary battery electrode containing an electrode active material, an electrically conductive agent, and a binding agent in a mass fraction of 92:2.7:5.3.

[2] The nonaqueous electrolyte secondary battery insulating porous layer as set forth in [1], wherein the peeling strength is 0.5 N/m to 2.0 N/m.

[3] A nonaqueous electrolyte secondary battery laminated separator including: a nonaqueous electrolyte secondary battery insulating porous layer recited in [1] or [2]; and a polyolefin porous film.

[4] A nonaqueous electrolyte secondary battery member including: a cathode; a nonaqueous electrolyte secondary battery insulating porous layer recited in [1] or [2] or a nonaqueous electrolyte secondary battery laminated separator recited in [3]; and an anode, the cathode, the nonaqueous electrolyte secondary battery insulating porous layer or the nonaqueous electrolyte secondary battery laminated separator, and the anode being arranged in this order.

[5] A nonaqueous electrolyte secondary battery including: a nonaqueous electrolyte secondary battery insulating porous layer recited in [1] or [2] or a nonaqueous electrolyte secondary battery laminated separator recited in [3].

Advantageous Effects of Invention

A nonaqueous electrolyte secondary battery insulating porous layer in accordance with an embodiment of the present invention yields the effect of having adhesion to an electrode when pressed with the electrode at room temperature and also having sufficiently high air permeability.

DESCRIPTION OF EMBODIMENTS

Figure 1:
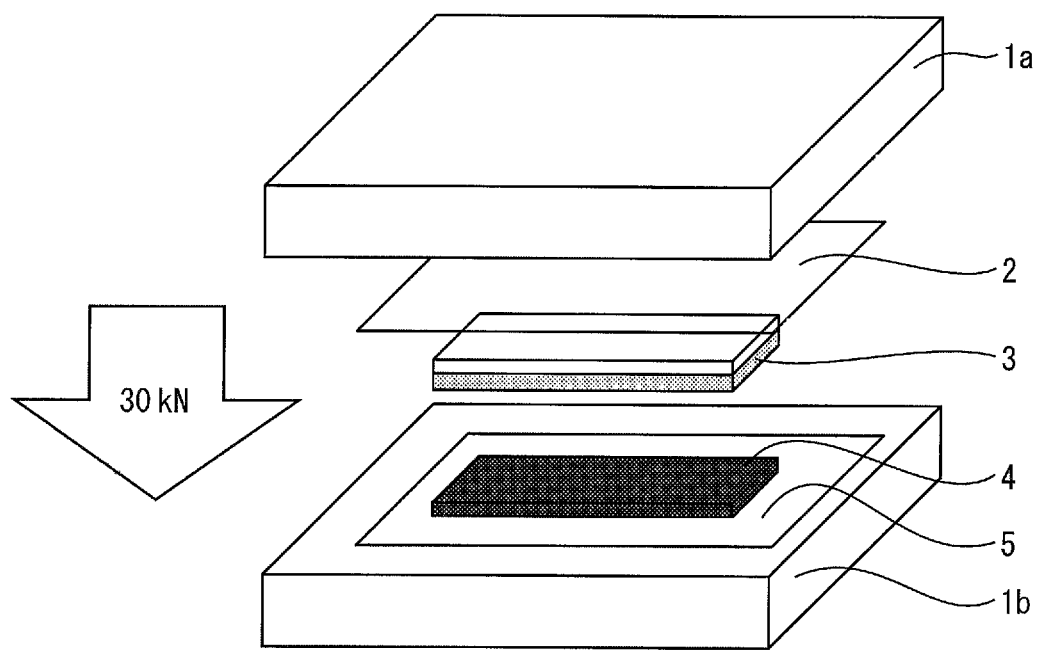
FIG. 1 is a diagram schematically illustrating a method of press-bonding a porous layer of an embodiment of the present invention and an electrode at 25° C. at 30 kN.

The following description will discuss an embodiment of the present invention. The present invention is, however, not limited to such an embodiment. Note, however, that the present invention is not limited to configurations described below, but can be altered in many ways by a person skilled in the art within the scope of the Claims. An embodiment derived from a proper combination of technical means disclosed in different embodiments is also encompassed in the technical scope of the present invention. Note that unless specified otherwise, any numerical range expressed as "A to B" herein means "not less than A and not greater than B".

Embodiment 1: Nonaqueous Electrolyte Secondary Battery Insulating Porous Layer A nonaqueous electrolyte secondary battery insulating porous layer (hereinafter also referred to simply as "porous layer") in accordance with Embodiment 1 of the present invention is a nonaqueous electrolyte secondary battery insulating porous layer for covering an entire area of at least one surface of a porous base material included in a nonaqueous electrolyte secondary battery laminated separator, wherein the nonaqueous electrolyte secondary battery insulating porous layer includes a thermoplastic resin, has a porosity of 25% to 80%, and has a peeling strength of above 0 N/m to 2.0 N/m when press-bonded to an electrode for a nonaqueous electrolyte secondary battery (hereinafter referred to as a "nonaqueous electrolyte secondary battery electrode") at 25° C. through two one-minute 30 kN applications, the nonaqueous electrolyte secondary battery electrode containing an electrode active material, an electrically conductive agent, and a binding agent in a mass fraction of 92:2.7:5.3.

The "nonaqueous electrolyte secondary battery electrode containing an electrode active material, an electrically conductive agent, and a binding agent in a mass fraction of 92:2.7:5.3" is an electrode having a typical composition used in a nonaqueous electrolyte secondary battery. Thus, it can be said that a porous layer, of Embodiment 1, having adhesion to an electrode has adhesion to a general electrode used in a nonaqueous electrolyte secondary battery.

More specifically, the nonaqueous electrolyte secondary battery electrode of Embodiment 1 is an electrode obtained in the following manner. That is, coating of a mixture, having viscosity of 2700±1000 cp, containing (i) 92 parts by weight of a cathode active material (CELLSEED C-10N [produced by Nippon Chemical Industrial Co., Ltd.], LiCoO$_2$, average particle size: 10 μm, true specific gravity: 4.8 g/cm$^3$), (ii) 2.7 parts by weight of an electrically conductive agent (acetylene black [produced by Denki Kagaku Kogyo Kabushiki Kaisha], true specific gravity: 2.2 g/cm$^3$), (iii) 4.55 parts by weight of a binding agent 1 (PTFE31-JR [produced by Du Pont-Mitsui Fluorochemicals Co., Ltd.], true specific gravity: 2.2 g/cm$^3$), (iv) 0.75 parts by weight of a binding agent 2 (Serogen 4H [produced by Dai-Ichi Kogyo Seiyaku Co., Ltd.], true specific gravity: 1.4 g/cm$^3$), and (v) water, is applied onto an aluminum foil having a thickness of 20 μm and having no voids, a resultant product is dried, and then a dried product is rolled with use of a roller press until a thickness of a coating film reaches a thickness of 140 μm (apparent density: 3.5 g/cm$^3$).

The following explains the expression "press-bonded to an electrode through two one-minute 30 kN applications" herein. That is, a laminated body is formed by laminating (i) a porous layer or a laminated separator including the porous layer and (ii) an electrode so that the porous layer and the electrode contact each other. Next, a pressure of 30 kN is applied, for one minute, uniformly onto an entire area of one surface of the laminated body which one surface (hereinafter referred to as "opposite surface") is a surface opposite a surface where the porous layer is in contact with the electrode. After a lapse of one minute, the pressure is temporarily removed, and immediately thereafter, a pressure of 30 kN is applied again, for one minute, uniformly onto the entire opposite surface of the laminated body. The expression "press-bonded to an electrode through two one-minute 30 kN applications" means a series of the above operations.

Here, FIG. 1 is a diagram schematically illustrating an example method of press-bonding the porous layer of an embodiment of the present invention and an electrode at 25° C. at 30 kN.

In FIG. 1, 1a indicates a tabletop press machine, 1b indicates a tabletop press machine, 2 indicates a polyethylene terephthalate (PET) film, 3 indicates a measurement sample (size: 25 mm×80 mm), 4 indicates an electrode, and 5 indicates a polyethylene terephthalate (PET) film. In order to prevent the electrode 4 and the measurement sample 3 from being broken, the press-bonding is preferably performed in a state in which the PET film 2 is provided between the tabletop press machine 1a and the measurement sample 3, and the PET film 5 is provided between the tabletop press machine 1b and the electrode 4.

The measurement sample 3 in FIG. 1 corresponds to the member expressed as "a porous layer or a laminated separator including the porous layer". Further, the "laminated body" is the one formed in such a manner that the measurement sample 3 and the electrode 4 are disposed in contact with each other (that is, in such a manner that one surface of the measurement sample 3 is superposed with one surface of the electrode 4). The "opposite surface" corresponds to an upper surface of the measurement sample 3 in FIG. 1 (surface on which the PET film 2 is placed) and a lower surface of the electrode 4 (surface of the electrode 4 which surface contacts the PET film 5).

Specific examples of the method of applying a pressure of 30 kN uniformly onto the entire opposite surface includes a method of applying a pressure uniformly onto the entire opposite surface by use of a tabletop press machine having an area larger than that of the opposite surface.

Specific examples of the method in which after a pressure is applied for one minute, the pressure is then removed temporarily, and immediately thereafter, a pressure is applied again, includes a method in which after a pressure is applied with a press machine pressed onto the opposite surface (first pressure application), the press machine is temporarily moved off from the opposite surface, and immediately thereafter, a pressure is applied again with the press machine pressed onto the opposite surface (second pressure application). Note that a period of time from the end of the first pressure application to the start of the second pressure application, i.e., a period of time for which the press machine is moved away from the opposite surface, is a short period of time which is shorter than 120 seconds.

A porous layer in accordance with an embodiment of the present invention can be used as a constituent member of a nonaqueous electrolyte secondary battery, preferably as a constituent member of a nonaqueous electrolyte secondary battery laminated separator in accordance with an embodiment of the present invention (described later). Specifically, a porous layer in accordance with an embodiment of the present invention can form a nonaqueous electrolyte secondary battery laminated separator in accordance with an embodiment of the present invention by being disposed on one surface or both surfaces of a polyolefin porous film (hereinafter also referred to as a "porous base material") included in a nonaqueous electrolyte secondary battery laminated separator.

The porous layer in accordance with an embodiment of the present invention is covered on an entire area of at least one surface of a porous base material in a case where the porous layer is included in a nonaqueous electrolyte secondary battery laminated separator.

In a case where a porous base material has a portion which is not covered with a porous layer, a difference in ion permeability occurs between a portion which is covered with the porous layer and a portion which is not covered with the porous layer. This may cause deterioration of an electrode and decrease a cycle characteristic of a battery. Further, in the case where a porous base material has a portion which is not covered with a porous layer, uniform adhesion between a nonaqueous electrolyte secondary battery laminated separator and an electrode cannot be achieved. This may cause misalignment between the nonaqueous electrolyte secondary battery laminated separator and the electrode. Moreover, in a case where the porous layer is a heat-resistant porous layer, the following defect occurs. That is, when a nonaqueous electrolyte secondary battery laminated separator is subjected to high temperatures, thermal shrinkage of the porous base material occurs from the portion which is not covered with the porous layer. This may decrease performance of the nonaqueous electrolyte secondary battery laminated separator. Since the porous layer in accordance with an embodiment of the present invention covers an entire area of at least one surface of a porous base material, it is possible to provide uniform ion permeability, provide suitable adhesion to an electrode, and prevent occurrence of the thermal shrinkage.

The porous layer in accordance with an embodiment of the present invention includes a thermoplastic resin. The porous layer has many pores therein, the pores being connected to one another, so that a gas, a liquid, or the like can pass through the porous layer from one surface of the porous layer to the other. In a case where the porous layer in accordance with an embodiment of the present invention is used as a constituent member of a nonaqueous electrolyte secondary battery laminated separator, the porous layer serves as an outermost layer of the laminated separator, the outermost layer coming into contact with an electrode.

<Thermoplastic Resin>

The thermoplastic resin to be included in the porous layer in accordance with an embodiment of the present invention is preferably insoluble in an electrolyte of a battery and is preferably electrochemically stable when the battery is in normal use. Specific examples of the thermoplastic resin encompass: polyolefins such as polyethylene, polypropylene, polybutene, and an ethylene-propylene copolymer; fluorine-containing resins such as polyvinylidene fluoride (PVDF), polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoro ethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer, and any of these fluorine-containing resins which is a fluorine-containing rubber having a glass transition temperature of equal to or less than 23° C.; aromatic polymers; rubbers such as a styrene-butadiene copolymer and a hydride thereof, a methacrylic acid ester copolymer, an acrylonitrile-acrylic acid ester copolymer, a styrene-acrylic acid ester copolymer, ethylene propylene rubber, and polyvinyl acetate; resins with a melting point or glass transition temperature of not lower than 180° C. such as polysulfone and polyester; and water-soluble polymers such as polyvinyl alcohol, polyethylene glycol, cellulose ether, sodium alginate, polyacrylic acid, polyacrylamide, and polymethacrylic acid.

Further, the thermoplastic resin included in the porous layer in accordance with an embodiment of the present invention is preferably an aromatic polymer. Note that "aromatic polymer" herein means a polymer in which an aromatic ring is contained. That is, the "aromatic polymer" means that monomers which constitute the thermoplastic resin contain aromatic compounds.

Specific examples of the aromatic polymer encompass aromatic polyamide, aromatic polyimide, aromatic polyester, aromatic polycarbonate, aromatic polysulfone, and aromatic polyether. The aromatic polymer is preferably aromatic polyamide, aromatic polyimide, and aromatic polyester, and more preferably aromatic polyester. Further, the aromatic polymer is preferably a wholly aromatic polymer in which a main chain has no aliphatic carbon.

Common names of polymers described herein each indicate a main binding type of the polymer. For example, in a case where a polymer contained in the thermoplastic resin in accordance with an embodiment of the present invention is an aromatic polymer referred to as "aromatic polyester", "aromatic polyester" indicates that not less than 50% of bonds constituting a main chain in molecules of the aromatic polymer are ester bonds. Note that the aromatic polymer referred to as "aromatic polyester" can contain, in bonds constituting a main chain, bonds other than ester bonds (such as amide bonds and imide bonds).

A thermoplastic resin contained in the porous layer in accordance with an embodiment of the present invention is preferably a condensation polymer. Note that the "condensation polymer" herein means a polymer obtained through condensation polymerization of monomers serving as a raw material.

The thermoplastic resin contained in the porous layer in accordance with an embodiment of the present invention is ordinarily a thermoplastic resin not having a softening point of below 25° C. That is, the porous layer in accordance with an embodiment of the present invention elastically deforms and adheres to an electrode in a temperature environment of 25° C. More specifically, elastic deformation of the thermoplastic resin increases a contact area between the porous layer and a nonaqueous electrolyte secondary battery electrode. This allows for adhesion between the porous layer in accordance with an embodiment of the present invention and the electrode.

A structure of the nonaqueous electrolyte secondary battery electrode, which structure involves the contact area between the porous layer and the nonaqueous electrolyte secondary battery electrode, is determined by a mass ratio between an electrode active material and a binder.

As such, the porous layer in accordance with an embodiment of the present invention has a certain degree of adhesion to a nonaqueous electrolyte secondary battery electrode including an electrode active material and a binder in a substantially constant mass ratio, regardless of what materials (ingredients) constitute the nonaqueous electrolyte secondary battery electrode.

Note that the "thermoplastic resin not having a softening point of below 25° C." herein includes both a thermoplastic resin having a softening point of 25° C. or higher and a thermoplastic resin having an unobservable softening point and thermally decomposed before being softened.

Further, the thermoplastic resin is preferably a thermoplastic resin (heat-resistant resin) not having a softening point of below 150° C.

Thanks to the thermoplastic resin not having a softening point of below 150° C., a nonaqueous electrolyte secondary battery laminated separator including the porous layer is impervious to be softened by heat caused while a battery is being operated. This achieves increase in heat resistance of a nonaqueous electrolyte secondary battery laminated separator.

Note that the thermoplastic resin contained in the porous layer in accordance with an embodiment of the present invention can be a single type of resin or a mixture of two or more types of resins.

Examples of the aromatic polyamide encompass: wholly aromatic polyamides such as para-aramid and meta-aramid; semi-aromatic polyamide; 6T nylon; 6I nylon; 8T nylon; 10T nylon; denatured products of these compounds; and copolymers of these compounds.

The aromatic polyimide is preferably a wholly aromatic polyimide prepared through condensation polymerization of an aromatic dianhydride and an aromatic diamine. Specific examples of the dianhydride encompass pyromellitic dianhydride, 3,3',4,4'-diphenyl sulfone tetracarboxylic dianhydride, 3,3',4,4'-benzophenone tetracarboxylic dianhydride, 2,2'-bis(3,4-dicarboxyphenyl)hexafluoropropane, and 3,3',4,4'-biphenyl tetracarboxylic dianhydride. Specific examples of the diamine encompass, but are not limited to, oxydianiline, paraphenylenediamine, benzophenone diamine, 3,3'-methylenedianiline, 3,3'-diaminobenzophenone, 3,3'-diaminodiphenyl sulfone, and 1,5'-naphthalene diamine. In an embodiment of the present invention, it is possible to suitably use any polyimide which is soluble in a solvent. Examples of such a polyimide encompass a polyimide which is a polymerization condensate obtained from 3,3',4,4'-diphenyl sulfone tetracarboxylic dianhydride and aromatic diamine.

Examples of the aromatic polyester encompass the following polyesters. These aromatic polyesters are preferably wholly aromatic polyesters.
(1) A polymer obtained by polymerizing an aromatic hydroxycarboxylic acid, an aromatic dicarboxylic acid, and an aromatic diol,
(2) A polymer obtained by polymerizing aromatic hydroxycarboxylic acids of identical type or differing types,
(3) A polymer obtained by polymerizing an aromatic dicarboxylic acid and an aromatic diol,
(4) A polymer obtained by polymerizing (i) an aromatic hydroxycarboxylic acid, (ii) an aromatic dicarboxylic acid, and (iii) an aromatic amine having a phenolic hydroxide group,
(5) A polymer obtained by polymerizing (i) an aromatic dicarboxylic acid and (ii) an aromatic amine having a phenolic hydroxide group,
(6) A polymer obtained by polymerizing an aromatic hydroxycarboxylic acid, an aromatic dicarboxylic acid, and an aromatic diamine,
(7) A polymer obtained by polymerizing an aromatic hydroxycarboxylic acid, an aromatic dicarboxylic acid, an aromatic diamine, and an aromatic diol,
(8) A polymer obtained by polymerizing (i) an aromatic hydroxycarboxylic acid, (ii) an aromatic dicarboxylic acid, (iii) an aromatic amine having a phenolic hydroxide group, and (iv) an aromatic diol.

Of the wholly aromatic polyesters above, the aromatic polyesters of (4) through (7) or (8) are preferable in view of solubility in a solvent. Excellent solubility in a solvent allows an increase in productivity of a porous layer.

Note that instead of using an aromatic hydroxycarboxylic acid, aromatic dicarboxylic acid, an aromatic diol, an aromatic diamine, or an aromatic amine having a phenolic hydroxide group, it is possible to use (i) an ester-forming derivative of any of these or (ii) an amide-forming derivative of any of these.

Examples of the ester-forming derivatives of carboxylic acids and amide-forming derivatives of carboxylic acids encompass (i) compounds, such as an acid chloride and an acid anhydride, in each of which a carboxyl group is a highly reactive derivative so that a polyester formation reaction or a polyamide formation reaction is promoted and (ii) compounds in each of which an ester or an amide is formed by a carboxyl group and alcohols, an ethylene glycol, or an amine, any of which generates a polyester or a polyamide by an ester exchange reaction or an amide exchange reaction, respectively.

Examples of the ester-forming derivative of the phenolic hydroxide group encompass a compound in which an ester is formed by a phenolic hydroxide group and carboxylic acids so as to generate polyester by an ester exchange reaction.

Examples of an amide-forming derivative of an amino group encompass a compound in which an amide is formed by an amino group and carboxylic acids so as to generate polyamide by an amide exchange reaction.

Alternatively, the aromatic hydroxycarboxylic acid, the aromatic dicarboxylic acid, the aromatic diol, the aromatic amine having a phenolic hydroxide group, and the aromatic diamine can each be substituted by an alkyl group such as a methyl group or an ethyl group or by an aryl group such as a phenyl group, provided that an ester forming property or an amide forming property is not impaired.

Examples of a repeating structural unit of the wholly aromatic polyester encompass, but are not limited to, the following repeating structural units.

A repeating structural unit derived from an aromatic hydroxycarboxylic acid:

[Chem. 1]

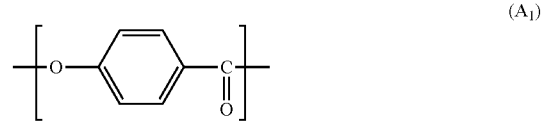

(A₁)

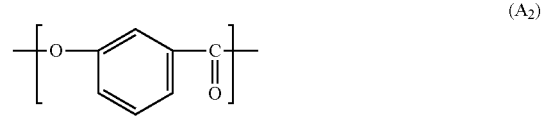

(A₂)

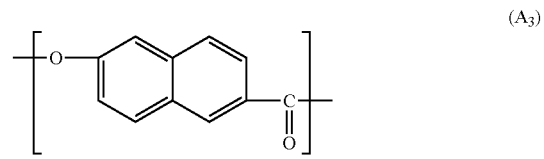

(A₃)

-continued

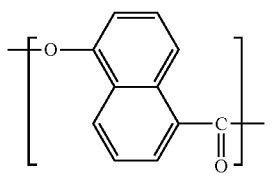
(A₄)

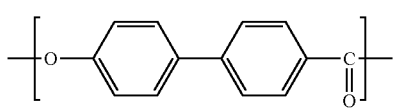
(A₅)

The above repeating structural unit can be substituted by an alkyl group or an aryl group.

A repeating structural unit derived from an aromatic dicarboxylic acid:

[Chem. 2]

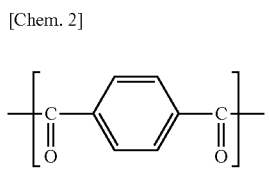
(B₁)

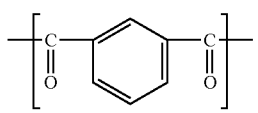
(B₂)

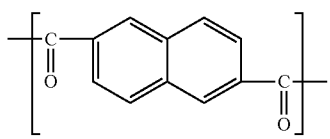
(B₃)

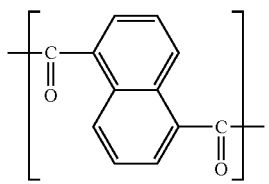
(B₄)

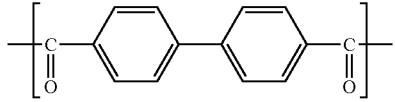
(B₅)

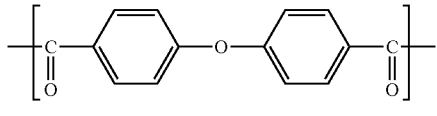
(B₆)

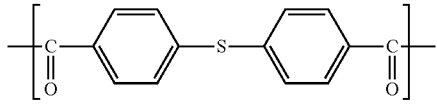
(B₇)

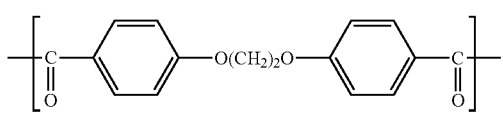
(B₈)

The above repeating structural unit can be substituted by an alkyl group or an aryl group.

A repeating structural unit derived from an aromatic diol:

[Chem. 3]

(C₁)

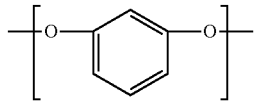
(C₂)

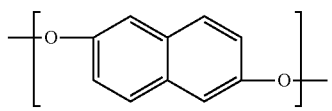
(C₃)

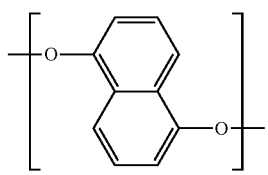
(C₄)

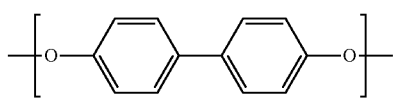
(C₅)

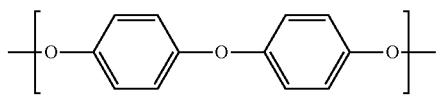
(C₆)

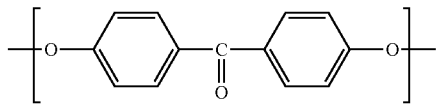
(C₇)

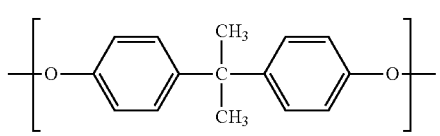
(C₈)

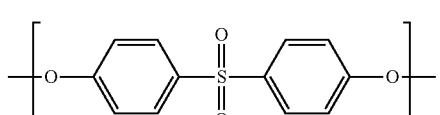
(C₉)

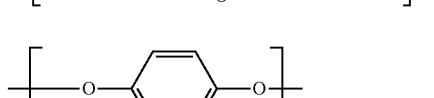
(C₁₀)

The above repeating structural unit can be substituted by an alkyl group or an aryl group.

A repeating structural unit derived from an aromatic amine having a phenolic hydroxide group:

[Chem. 4]

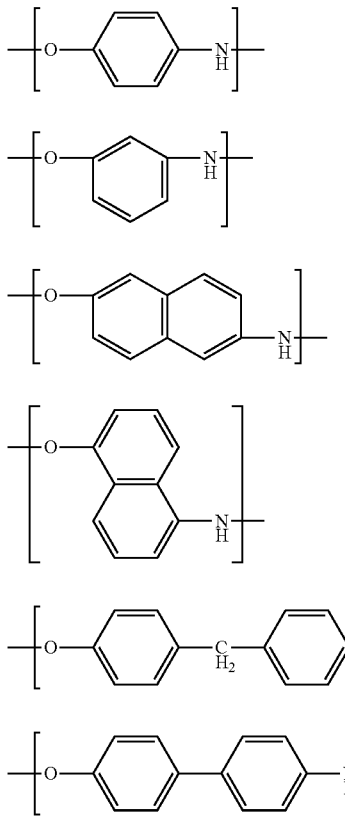

(D₁)
(D₂)
(D₃)
(D₄)
(D₅)
(D₆)

The above repeating structural unit can be substituted by an alkyl group or an aryl group. All or part of hydrogen atoms binding to nitrogen atoms can be substituted by an alkyl group or an acyl group.

A repeating structural unit derived from an aromatic diamine:

[Chem. 5]

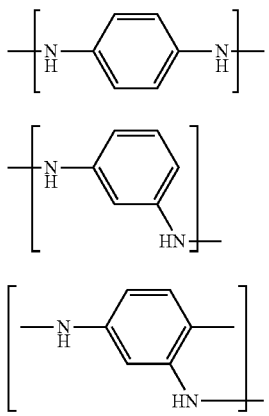

(E₁)
(E₂)
(E₃)

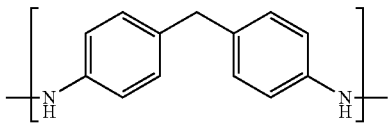

(E₄)

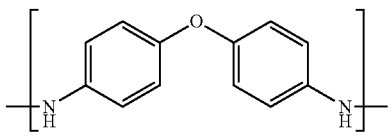

(E₅)

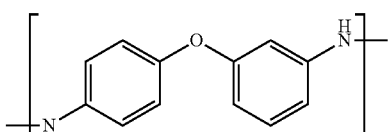

(E₆)

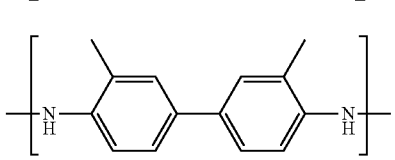

(E₇)

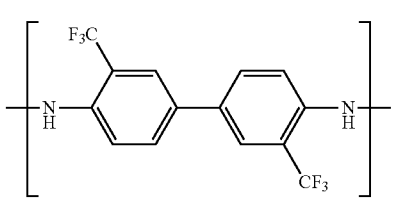

(E₈)

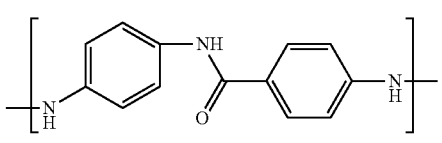

(E₉)

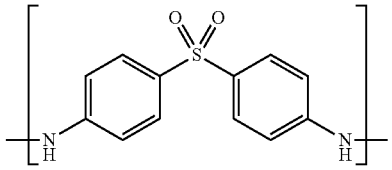

(E₁₀)

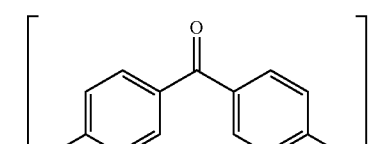

(E₁₁)

The above repeating structural unit can be substituted by an halogen atom, an alkyl group or an aryl group.

Ordinarily, the alkyl group by which the repeating structural unit can be substituted is, for example, C1-10 alkyl groups. Among the C1-10 alkyl groups, a methyl group, an ethyl group, a propyl group, and a butyl group are preferable. Ordinarily, the aryl group by which the repeating structural unit can be substituted is, for example, C6-20 aryl groups. Among the C6-20 aryl groups, a phenyl group is preferable. All or part of hydrogen atoms binding to nitrogen atoms can be substituted by an alkyl group or an acyl group. Examples of the halogen atom by which the repeating structural unit can be substituted encompass a fluorine atom, a chlorine atom, and a bromine atom.

In view of a further increase in heat resistance of the nonaqueous electrolyte laminated separator in accordance with an embodiment of the present invention, the wholly aromatic polyester preferably contains a repeating unit represented by the above formula $(A_1)$, $(A_3)$, $(B_1)$, $(B_2)$ or $(B_3)$.

Examples of a preferable combination of the repeating structural units encompass the following combinations (a) through (d):

(a):
a combination of the repeating structural units $(A_1)$, $(B_2)$, and $(D_1)$,
a combination of the repeating structural units $(A_3)$, $(B_2)$, and $(D_1)$,
a combination of the repeating structural units $(A_1)$, $(B_1)$, $(B_2)$, and $(D_1)$,
a combination of the repeating structural units $(A_3)$, $(B_1)$, $(B_2)$, and $(D_1)$,
a combination of the repeating structural units $(A_3)$, $(B_3)$, and $(D_1)$, or
a combination of the repeating structural units $(B_1)$, $(B_2)$ or $(B_3)$, and $(D_1)$.

(b): a combination in which all or part of $(D_1)$ in the combination (a) is substituted by $(D_2)$.

(c): a combination in which part of $(A_1)$ in the combination (a) is substituted by $(A_3)$.

(d): a combination in which all or part of $(D_1)$ in the combination (a) is substituted by $(C_1)$ or $(C_3)$.

(e): a combination in which all or part of $(D_1)$ in the combination (a) is substituted by $(E_1)$ or $(E_5)$.

Examples of a more preferable combination encompass (i) a repeating structural unit, in an amount of 10 mol % to 50 mol %, derived from at least one compound selected from the group consisting of p-hydroxybenzoic acid and 2-hydroxy-6-naphthoic acid, (ii) a repeating structural unit, in an amount of 10 mol % to 50 mol %, derived from at least one compound selected from the group consisting of 4-hydroxyaniline and 4,4'-diaminodiphenyl ether, (iii) a repeating structural unit, in an amount of 10 mol % to 50 mol %, derived from at least one compound selected from the group consisting of a terephthalic acid and an isophthalic acid, and (iv) a repeating structural unit, in an amount of 10 mol % to 19 mol %, derived from hydrochinone. Examples of a further preferable combination encompass (i) a repeating structural unit, in an amount of 10 mol % to 35 mol %, derived from 4-hydroxyaniline and (ii) a repeating structural unit, in an amount of 20 mol % to 45 mol %, derived from an isophthalic acid.

A method of preparing the thermoplastic resin can be a method known to a person skilled in the art, and is not limited to any particular one. A method of preparing an aromatic polyester will be described below as an example of the method for preparing the thermoplastic resin.

Examples of the method of preparing an aromatic polyester encompass a method in which (i) an aromatic hydroxycarboxylic acid, an aromatic diol, an aromatic amine having a phenolic hydroxide group, or an aromatic diamine is subjected to acylation (acylation reaction) by an excess amount of fatty acid anhydride, so that an acylated product is obtained and (ii) the acylated product thus obtained and an aromatic hydroxycarboxylic acid and/or an aromatic dicarboxylic acid are subjected to ester exchange or amide exchange so as to be polymerized.

In the acylation reaction, an amount of the fatty acid anhydride to be added is preferably 1.0 equivalent to 1.2 equivalents with respect to a total amount of the phenolic hydroxide group and the amino group combined.

The acylation reaction is preferably carried out at 130° C. to 180° C. for 5 minutes to 10 hours, and more preferably at 140° C. to 160° C. for 10 minutes to 3 hours.

Examples of the fatty acid anhydride to be used for the acylation reaction encompass, but are not particularly limited to, acetic anhydride, propionic anhydride, butyric anhydride, and isobutyric anhydride. Two or more of these can be mixed when used. In view of cost and workability, acetic anhydride is preferable.

During the polymerization through the ester exchange or amide exchange, an amount of the acyl group of the acylated product is preferably 0.8 equivalents to 1.2 equivalents with respect to an amount of the carboxyl group. A polymerization temperature is preferably not more than 400° C., and more preferably not more than 350° C.

Note that the acylation reaction and the polymerization through the ester exchange or amide exchange can be carried out in the presence of a catalyst. The catalyst can be a catalyst that is conventionally and publicly known as a polyester polymerization catalyst.

Polymerization through ester exchange or amide exchange is ordinarily melt polymerization. Alternatively, it is possible to carry out melt polymerization and solid phase polymerization in combination. Solid phase polymerization can be carried out by (i) extracting a polymer during a melt polymerization step, (ii) solidifying the extracted polymer, (iii) crushing the resultant polymer into a powder-like polymer or a flake-like polymer, and then (iv) subjecting the powder-like polymer or the flake-like polymer to publicly known solid phase polymerization. Specific examples of the solid phase polymerization encompass a method in which the powder-like polymer or the flake-like polymer in a solid-phase state is heated in an inert atmosphere such as nitrogen at 20° C. to 350° C. for 1 hour to 30 hours. Note that an aromatic polyester obtained after the solid phase polymerization can be pelletized by a publicly known method before being used.

<Inorganic Filler>

The porous layer in accordance with an embodiment of the present invention preferably further includes an inorganic filler. The inorganic filler is insulating, and a material of the inorganic filler can be an inorganic powder.

Examples of the inorganic powder encompass powders made of inorganic matters such as metal oxide, metal nitride, metal carbide, metal hydroxide, carbonate, and sulfate. Specific examples of the inorganic powder encompass powders made of inorganic matters such as alumina, silica, titanium dioxide, aluminum hydroxide, and calcium carbonate. The inorganic filler can be made of one of these inorganic powders, or can be made of two or more of these inorganic powders mixed. Among these inorganic powders, an alumina powder is preferable in view of chemical stability. It is more preferable that particles by which the inorganic filler is constituted are all alumina particles. It is a still more preferable embodiment that (i) the particles by which the inorganic filler is constituted are all alumina particles and (ii) all or part of the alumina particles are substantially spherical alumina particles. Note that in an embodiment of the present invention, the substantially spherical alumina particles include absolutely spherical particles.

In a case where, for example, the particles by which the inorganic filler is constituted are all alumina particles, a weight of the inorganic filler relative to a total weight of the porous layer in accordance with an embodiment of the present invention is ordinarily 20% by weight to 95% by weight, and preferably 30% by weight to 90% by weight, although an inorganic filler content of the porous layer depends also on a specific gravity of the material of the inorganic filler. The above ranges can be set as appropriate according to the specific gravity of the material of the inorganic filler.

Examples of a shape of the inorganic filler encompass a substantially spherical shape, a plate-like shape, a pillar shape, a needle shape, a whisker-like shape, and a fibrous shape. Although any particle can be used to constitute the inorganic filler, substantially spherical particles are preferable because substantially spherical particles allow uniform pores to be easily made. In view of strength and smoothness of the porous layer, an average particle diameter of particles by which the inorganic filler is constituted is preferably 0.01 µm to 1 µm. Note that the average particle diameter is to be indicated by a value measured with the use of a photograph taken by a scanning electron microscope. Specifically, any 50 particles of particles captured in the photograph are selected, respective particle diameters of the 50 particles are measured, and then an average value of the particle diameters thus measured is used as the average particle diameter.

<Physical Properties of Porous Layer>

In a case where the porous layer is disposed on both surfaces of a porous base material, the physical properties in the following description regarding physical properties of the porous layer refers to at least physical properties of a porous layer disposed on a surface of the porous base material which surface faces a cathode of the nonaqueous electrolyte secondary battery.

In a case where a porous layer is disposed on one surface or both surfaces of the porous base material, a thickness of the porous layer is preferably 0.5 µm to 15 µm (per surface of the porous film), and more preferably 2 µm to 10 µm (per surface of the porous film), although the thickness of the porous layer can be decided as appropriate in view of a thickness of a nonaqueous electrolyte secondary battery laminated separator to be produced.

The thickness of the porous layer is preferably not less than 1 µm (not less than 0.5 µm per surface of the porous film). This is because, with such a thickness, (i) an internal short circuit of the battery, which internal short circuit is caused by breakage or the like of the battery, can be sufficiently prevented in a nonaqueous electrolyte secondary battery laminated separator which includes the porous layer and (ii) an amount of an electrolyte retained in the porous layer can be maintained.

Meanwhile, a total thickness of both the surfaces of the porous layer is preferably not more than 30 µm (not more than 15 µm per surface of the porous film). This is because, with such a thickness, (i) it is possible to restrict an increase in resistance to permeation of ions such as lithium ions all over the nonaqueous electrolyte secondary battery laminated separator which includes the porous layers, (ii) it is possible to prevent the cathode from deteriorating in a case where a charge-discharge cycle is repeated, so that a rate characteristic and/or a cycle characteristic is/are prevented from deteriorating, and (iii) an increase in distance between the cathode and an anode is restricted, so that the nonaqueous electrolyte secondary battery can be prevented from being large in size.

A porosity of the porous layer in accordance with an embodiment of the present invention is preferably 25% to 80%, and more preferably 30% to 75%. The porosity of the porous layer is calculated from, for example, specific gravity and volume of a porous layer. The porosity falling within the above range is preferable in view of ion permeability of a porous layer to be obtained and of a nonaqueous electrolyte secondary battery laminated separator including the porous layer.

The porosity of the porous layer in accordance with an embodiment of the present invention is determined from a thickness [µm], a weight per unit area [g/m$^2$], and a true density [g/m$^3$], which are calculated and measured by, for example, the following methods.

(Measurement of Thickness)

A thickness of a nonaqueous electrolyte secondary battery laminated separator and a thickness of a porous base material used for the nonaqueous electrolyte secondary battery laminated separator are measured with use of a high-precision digital length measuring machine (manufactured by Mitutoyo Corporation) in conformity with the JIS standard (K 7130-1992). From a difference between the obtained thickness of the nonaqueous electrolyte secondary battery laminated separator and the obtained thickness of the porous base material, a thickness of a nonaqueous electrolyte secondary battery insulating porous layer is calculated.

(Weight Per Unit Area)

A square with one side 8 cm in length is cut off, as a sample, from a nonaqueous electrolyte secondary battery laminated separator, and a weight $W_2$ (g) of the sample is measured. A square with one side 8 cm in length is cut off, as a sample, from a porous base material used for the nonaqueous electrolyte secondary battery laminated separator, and a weight $W_1$ (g) of the sample is measured. Then, a weight per unit area of the nonaqueous electrolyte secondary battery insulating porous layer is calculated based on the following equation (2):

$$\text{Weight per unit area } (g/m^2) = (W_2 - W_1)/(0.08 \times 0.08) \quad \text{Equation (2)}.$$

(True Density)

A porous layer of a nonaqueous electrolyte secondary battery laminated separator is cut into a piece of 4 mm to 6 mm per side, and the cut piece is vacuum-dried at 30° C. or lower temperature for 17 hours. Thereafter, a true density of the vacuum-dried product is measured by a helium gas displacement method by use of a dry type automatic densitometer (AccuPyc II 1340 manufactured by Micromeritics Instrument Corporation).

From the thickness [µm], weight per unit area [g/m$^2$], and true density [g/m$^3$] obtained as described above, the porosity is calculated based on the following equation:

$$\text{Porosity of porous layer [\%]} = [1 - (\text{weight per unit area } [g/m^2] \text{ of porous layer})/\{(\text{thickness } [\mu m] \text{ of porous layer}) \times 10^{-6} \times (\text{true density } [g/m^3] \text{ of porous layer})\}] \times 100$$

In view of ion permeability of a nonaqueous electrolyte secondary battery laminated separator including the porous layer, air permeability of the porous layer in accordance with an embodiment of the present invention is preferably 30 sec/100 cc to 300 sec/100 cc, and more preferably 50 sec/100 cc to 250 sec/100 cc. If the air permeability falls within the above range, it is possible to maintain good ion permeability of the porous layer. As a result, it is possible to improve a battery characteristic such as a resistance value of a nonaqueous electrolyte secondary battery including the porous layer.

<Peeling Strength>

The porous layer in accordance with an embodiment of the present invention has a peeling strength of above 0 N/m to 2.0 N/m when press-bonded to a nonaqueous electrolyte secondary battery electrode at 25° C. through two one-minute 30 kN applications, the nonaqueous electrolyte secondary battery electrode containing an electrode active material, an electrically conductive agent, and a binding agent in a mass fraction of 92:2.7:5.3.

The higher peeling strength is, that is, the higher adhesion between an electrode and a porous layer is, the porous layer is considered to have characteristics of being softer and allowing for easier adhesion to an electrode. Therefore, since a porous layer having too high the peeling strength is too soft, a pore structure inside the porous layer is easily clogged. This decreases air permeability. Besides, the pore structure is more easily clogged when a porous layer and an electrode are press-bonded. Thus, in an assembled nonaqueous electrolyte secondary battery including a porous layer having too high the peeling strength, air permeability of the porous layer and of a nonaqueous electrolyte secondary battery laminated separator including the porous layer may become lower.

In view of preventing the air permeability from being deteriorated, the peeling strength is preferably 1.7 N/m or lower.

Meanwhile, in a case where the peeling strength is too low, misalignment between an electrode and a nonaqueous electrolyte secondary battery laminated separator including the porous layer may occur during assembly of a nonaqueous electrolyte secondary battery.

As such, in view of preventing occurrence of the misalignment and improving productivity of production of a nonaqueous electrolyte secondary battery, the peeling strength is above 0 N/m, preferably 0.1 N/m or higher, and more preferably 0.5 N/m or higher.

Further, the peeling strength is preferably above 0 N/m in view of allowing for assembly of a nonaqueous electrolyte secondary battery at room temperature (e.g., 25° C.) in a dry state in a situation where heating or the like operation is not performed, reducing a cost of producing a nonaqueous electrolyte secondary battery, and improving productivity of battery production.

A porous layer having the above peeling strength can be obtained by suitably adjusting a thermoplastic resin included in the porous layer. For example, in a case where a porous layer in accordance with an embodiment of the present invention includes the above aromatic polymer serving as a thermoplastic resin, a peeling strength of the porous layer can be so controlled as to fall within the above range by adjusting an amount ratio (mole ratio) between para-oriented repeating units included in the aromatic polymer and meta-oriented repeating units included in the aromatic polymer to adjust flexibility of a polymer. Further, in a case where a porous layer including one thermoplastic resin cannot obtain the peeling strength falling within the above range, it is possible to mix the one thermoplastic resin and another resin having a property different from a property of the one thermoplastic resin so that a peeling strength of a porous layer can be so controlled as to fall within the above range. Examples of mixing of two thermoplastic resins include mixing of aromatic polyester and aromatic polyester.

<Peeling Strength Measurement Method>

Figure 2:
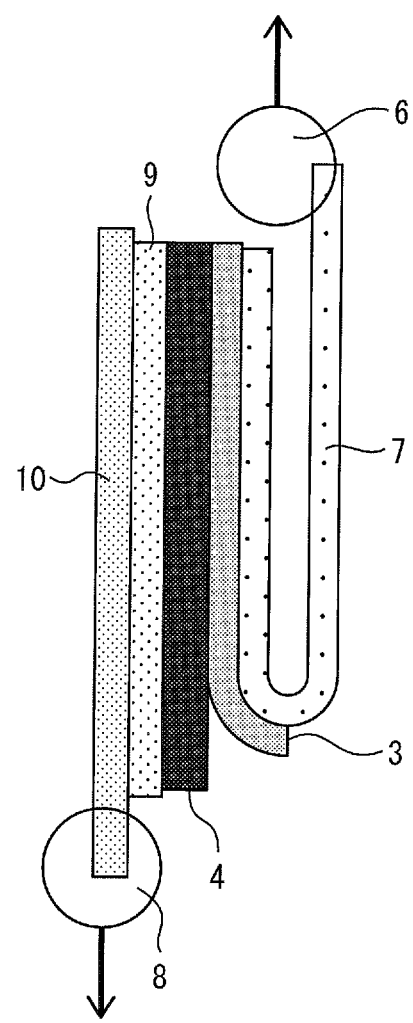
FIG. 2 is a diagram schematically illustrating a method of measuring a peeling strength in an embodiment of the present invention.

An example method of measuring the peeling strength is discussed with reference to FIGS. 1 and 2. Here, FIG. 1 is a diagram schematically illustrating an example method of press-bonding the porous layer of an embodiment of the present invention and an electrode at 25° C. at 30 kN, as described previously. FIG. 2 is a diagram schematically illustrating a method of measuring a peeling strength in an embodiment of the present invention.

The members illustrated in FIG. 1 have already been described. In FIG. 2, 6 indicates a jig fixing area, 7 indicates a mending tape, 8 indicates a jig fixing area, 9 indicates a double-faced adhesive tape, and 10 indicates a glass epoxy resin board. Note that in FIG. 2, the members given the same reference numerals as those in FIG. 1 will not be explained.

As described previously, the measurement sample 3 and the electrode 4 are press-bonded by the method illustrated in FIG. 1, so that a nonaqueous electrolyte secondary battery member having the electrode 4 and the measurement sample 3 arranged in this order is obtained. Thereafter, for example, as illustrated in FIG. 2, a peeling strength measurement sample is prepared by attaching the glass epoxy resin board to an electrode 4 side of the obtained nonaqueous electrolyte secondary battery member with the double-faced adhesive tape 9 and adhering the mending tape 7 to the measurement sample 3.

Next, the peeling strength measurement sample is placed on a peeling strength measurement device (e.g., a Compact Table-Top Universal Tester) at jig fixing areas 6 and 8. The peeling strength measurement device is used to measure the magnitude of a force required to peel the measurement sample 3 and the electrode 4 away from each other when the mending tape 7 is peeled off in a lengthwise direction at a testing rate of 500 mm/min in a thickness direction. A measured value of the magnitude of the force is divided by a width of the measurement sample 3 to obtain a value of peeling strength (N/m). The measurement is carried out under the following conditions: load cell of 50 N, test length (length of the measurement sample 3) of 80 mm, and test width (width of the measurement sample 3) of 25 mm.

Note that a nonaqueous electrolyte secondary battery laminated separator is ordinarily a thin film, and thus in both of the following cases: a case where the porous layer is press-bonded to the electrode 4; and a case where the nonaqueous electrolyte secondary battery laminated separator is press-bonded to the electrode 4, (i) a pressure applied to the porous layer in the former case is equal to a pressure applied to the porous layer included in the nonaqueous electrolyte secondary battery laminated separator in the latter case, and (ii) adhesion of the porous layer to the electrode 4 in the former case is equal to adhesion of the porous layer to the electrode 4 in the latter case are equal to each other.

Therefore, the peeling strength of the porous layer in accordance with an embodiment of the present invention when press-bonded to a nonaqueous electrolyte secondary battery electrode at 25° C. through two one-minute 30 kN applications, can also be measured by measuring a peeling strength when (i) a nonaqueous electrolyte secondary battery laminated separator which has the porous layer as at least one outermost layer and (ii) an electrode are press-bonded at 25° C. through two one-minute 30 kN applications.

<Porous Layer Production Method>

The porous layer in accordance with an embodiment of the present invention can be produced by, for example, a method including: (i) dissolving the thermoplastic resin in a solvent and, optionally, dispersing the inorganic filler in the solvent, so as to prepare a coating solution for forming a porous layer; and (ii) coating a base material with the coating solution and then drying the coating solution, so as to deposit the porous layer in accordance with an embodiment of the present invention. Examples of the base material encompass (i) a porous base material described later and (ii) an electrode.

The solvent (dispersion medium) is not limited to any particular one, provided that (i) the solvent does not have an adverse effect on the base material, (ii) the solvent allows the thermoplastic resin to be uniformly and stably dissolved in the solvent, (iii) the solvent allows the inorganic filler to be uniformly and stably dispersed in the solvent. Specific examples of the solvent (dispersion medium) encompass N-methylpyrrolidone, N,N-dimethylacetamide, and N,N dimethylformamide. Only one of these solvents (dispersion media) can be used, or two or more of these solvents (dispersion media) can be used in combination.

The coating solution can be formed by any method, provided that the coating solution can satisfy conditions such as a resin solid content (resin concentration) and an amount of the inorganic filler, each of which conditions is necessary to obtain a desired porous layer. Specific examples of the method encompass a method in which an inorganic filler is added to and dispersed in a solution which is obtained by dissolving the thermoplastic resin in a solvent (dispersion medium). In a case where the inorganic filler is added, the inorganic filler can be dispersed in a solvent (dispersion medium) with the use of a conventionally and publicly known dispersing device, examples of which encompass a three-one motor, a homogenizer, a medium type dispersing device, and a pressure type dispersing device.

A method of coating the base material with the coating solution encompass publicly known coating methods such as a knife coater method, a blade coater method, a bar coater method, a gravure coater method, and a die coater method.

A method of removing the solvent (dispersion medium) is generally a drying method. Examples of the drying method encompass natural drying, air-blowing drying, heat drying, and drying under reduced pressure. Note, however, any method can be used, provided that the solvent (dispersion medium) can be sufficiently removed. In addition, a drying step can be carried out after the solvent (dispersion medium) contained in the coating solution is replaced with another solvent. Specific examples of the method, in which the solvent (dispersion medium) is replaced with another solvent and then a drying step is carried out, encompass a method in which (i) the solvent (dispersion medium) is replaced with a poor solvent having a low boiling point, such as water, alcohol, and acetone, (ii) the porous layer is deposited, and then (iii) the drying step is carried out.

Embodiment 2: Nonaqueous Electrolyte Secondary Battery Laminated Separator

A nonaqueous electrolyte secondary battery laminated separator in accordance with Embodiment 2 of the present invention includes (i) a polyolefin porous film and (ii) the porous layer in accordance with Embodiment 1 of the present invention. Preferably, the nonaqueous electrolyte secondary battery laminated separator in accordance with Embodiment 2 of the present invention includes (i) a polyolefin porous film and (ii) a porous layer in accordance with Embodiment 1 of the present invention which porous layer is disposed on at least one surface of the polyolefin porous film.

The nonaqueous electrolyte secondary battery laminated separator in accordance with an embodiment of the present invention includes a nonaqueous electrolyte secondary battery insulating porous layer in accordance with an embodiment of the present invention and thus yields the effect of allowing air permeability, whose changes cause changes in battery characteristic correspondingly, to be maintained in a favorable range and providing excellent productivity of battery production.

<Polyolefin Porous Film>

A polyolefin porous film in an embodiment of the present invention is a porous film containing a polyolefin-based resin as a main component. The porous film is preferably a microporous film. Specifically, the porous film, which contains a polyolefin-based resin as a main component, has pores therein, the pores being connected to one another, so that a gas, a liquid, or the like can pass through the porous film from one surface of the porous film to the other. The porous film can include a single layer or a plurality of layers.

The "porous film containing a polyolefin-based resin as a main component" herein means that a polyolefin-based resin component is contained in the porous film at a proportion of ordinarily not less than 50% by volume, preferably not less than 90% by volume, and more preferably not less than 95% by volume of an entire portion of a material of the porous film. The polyolefin-based resin contained in the polyolefin porous film preferably contains a high molecular weight component having a high molecular weight of $5 \times 10^5$ to $15 \times 10^6$. It is preferable that polyolefin-based resin having a weight-average molecular weight of not less than 1,000,000 is contained as a polyolefin-based resin in the porous film. This is because, in such a case, there can be an increase in (i) strength of an entire portion of the polyolefin porous film and (ii) strength of an entire portion of a nonaqueous electrolyte secondary battery laminated separator which includes the polyolefin porous film and the porous layer.

Examples of the polyolefin-based resin encompass high molecular weight homopolymers (such as polyethylene, polypropylene, or polybutene) or high molecular weight copolymers (such as ethylene-propylene copolymer) produced through polymerization of ethylene, propylene, 1-butene, 4-methyl-1-pentene, and/or 1-hexene. The polyolefin porous film is a layer which includes one of these polyolefin-based resins and/or two or more of these polyolefin-based resins. A high molecular weight polyethylene-based resin containing ethylene as a main component is particularly preferable in view of the fact that such a polyethylene-based resin can prevent (shutdown) the flow of an excessively large current at a low temperature. Note that the polyolefin porous film can contain any component other than the polyolefin-based resin, provided that the component does not impair the function of the polyolefin porous film.

Air permeability of the polyolefin porous film in terms of Gurley values is ordinarily 30 sec/100 cc to 300 sec/100 cc, and preferably 50 sec/100 cc to 250 sec/100 cc. It is preferable that the air permeability of the polyolefin porous film falls within these ranges, because sufficient ion permeability can be imparted to the nonaqueous electrolyte secondary battery laminated separator in a case where the polyolefin porous film is used as a member of the nonaqueous electrolyte secondary battery laminated separator including the porous layer.

In regard to a thickness of the porous film, a less thickness can cause energy density of the battery to be higher. Therefore, the thickness of the porous film is preferably not more than 20 μm, more preferably not more than 16 μm, and still more preferably not more than 11 μm. In view of film strength, the thickness of the porous film is preferably not less than 4 μm. That is, the thickness of the porous film is preferably 4 μm to 20 μm.

A method of producing the porous film can be any publicly known method, and is not limited to any particular one. For example, as disclosed in Japanese Patent No. 5476844, the porous film can be produced by (i) adding a filler to a thermoplastic resin, (ii) forming, into a film, the thermoplastic resin containing the filler, and then (iii) removing the filler.

Specifically, in a case where, for example, the porous film is made of polyolefin resin containing ultra-high molecular weight polyethylene and low molecular weight polyolefin which has a weight-average molecular weight of not more than 10,000, the porous film is preferably produced by, in view of production costs, a method including the following steps (1) through (4):
(1) kneading 100 parts by weight of ultra-high molecular weight polyethylene, 5 parts by weight to 200 parts by weight of low molecular weight polyolefin having a weight-average molecular weight of not more than 10,000, and 100 parts by weight to 400 parts by weight of an inorganic filler such as calcium carbonate, so that a polyolefin resin composition is obtained;
(2) forming the polyolefin resin composition into a sheet;
(3) removing the inorganic filler from the sheet obtained in the step (2); and
(4) stretching the sheet obtained in the step (3).
Alternatively, the porous film can be produced through a method disclosed in any of the above-described Patent Literature.

Alternatively, the porous film in accordance with an embodiment of the present invention can be a commercial product having the above-described characteristics.

<Nonaqueous Electrolyte Secondary Battery Laminated Separator Production Method>

The nonaqueous electrolyte secondary battery laminated separator in accordance with an embodiment of the present invention can be produced by, for example, a method in which the polyolefin porous film is used as a base material in the above-described method of producing the porous layer in accordance with an embodiment of the present invention.

<Physical Properties of Nonaqueous Electrolyte Secondary Battery Laminated Separator>

In regard to a thickness of the nonaqueous electrolyte secondary battery laminated separator in accordance with an embodiment of the present invention, a less thickness can allow energy density of the battery to be higher, and is therefore preferable. However, a less thickness also leads to less strength, and there is therefore a limitation on a reduction in the thickness during production of the nonaqueous electrolyte secondary battery laminated separator. In view of these factors, the nonaqueous electrolyte secondary battery laminated separator in accordance with an embodiment of the present invention has a thickness of preferably not more than 50 μm, more preferably not more than 25 μm, and still more preferably not more than 20 μm. In addition, the nonaqueous electrolyte secondary battery laminated separator preferably has a thickness of not less than 5 μm.

Air permeability of the nonaqueous electrolyte secondary battery laminated separator in accordance with an embodiment of the present invention in terms of Gurley values is preferably 300 sec/100 cc or less, more preferably 30 sec/100 cc to 250 sec/100 cc, and even more preferably 50 sec/100 cc to 220 sec/100 cc. It is preferable that the nonaqueous electrolyte secondary battery laminated separator has air permeability falling within these ranges. This is because such a nonaqueous electrolyte secondary battery separator can have sufficient ion permeability, and a battery characteristic of a nonaqueous electrolyte secondary battery including the nonaqueous electrolyte secondary battery laminated separator can be improved.

If the air permeability is above these ranges, that is, if the Gurley value is lower than 30 sec/100 cc, then it means that the nonaqueous electrolyte secondary battery laminated separator has a high porosity and that a laminated structure is therefore rough. This poses a risk that strength of the nonaqueous electrolyte secondary battery laminated separator may decrease, so that shape stability particularly at a high temperature may be insufficient.

Meanwhile, if the air permeability is below these ranges, that is, if the Gurley value is higher than 300 sec/100 cc, then the nonaqueous electrolyte secondary battery laminated separator may not have sufficient ion permeability. This may cause deterioration of the battery characteristic of the nonaqueous electrolyte secondary battery.

Note that the nonaqueous electrolyte secondary battery laminated separator in accordance with an embodiment of the present invention can include, as needed, a publicly known porous film(s) such as an adhesive layer and/or a protection layer in addition to the polyolefin porous film and the porous layer, provided that the objective of an embodiment of the present invention is not impaired.

Embodiment 3: Nonaqueous Electrolyte Secondary Battery Member, Embodiment 4: Nonaqueous Electrolyte Secondary Battery A nonaqueous electrolyte secondary battery member in accordance with Embodiment 3 of the present invention is obtained by arranging a cathode, the nonaqueous electrolyte secondary battery insulating porous layer in accordance with Embodiment 1 of the present invention or the nonaqueous electrolyte secondary battery laminated separator in accordance with Embodiment 2 of the present invention, and an anode, the cathode, the nonaqueous electrolyte secondary battery insulating porous layer or the nonaqueous electrolyte secondary battery laminated separator, and the anode being arranged in this order.

A nonaqueous electrolyte secondary battery in accordance with Embodiment 4 of the present invention includes (i) the nonaqueous electrolyte secondary battery insulating porous layer in accordance with Embodiment 1 of the present invention or (ii) the nonaqueous electrolyte secondary battery laminated separator in accordance with Embodiment 2 of the present invention.

A nonaqueous electrolyte secondary battery in accordance with an embodiment of the present invention can be, for example, a nonaqueous secondary battery that achieves an electromotive force through doping and dedoping with lithium, and can include a nonaqueous electrolyte secondary battery member including a cathode, a nonaqueous electrolyte secondary battery insulating porous layer in accordance with an embodiment of the present invention, and an anode, the cathode, the nonaqueous electrolyte secondary battery insulating porous layer, and the anode being laminated in this order. Alternatively, the nonaqueous electrolyte secondary battery in accordance with an embodiment of the present invention can be, for example, a nonaqueous secondary battery that achieves an electromotive force through doping and dedoping with lithium, and can be a lithium ion secondary battery that includes a nonaqueous electrolyte secondary battery member including a cathode, a nonaqueous electrolyte secondary battery insulating porous layer in accordance with an embodiment of the present invention, a polyolefin porous film, and an anode which are laminated in this order, that is, a lithium ion secondary battery that includes a nonaqueous electrolyte secondary battery member including a cathode, a nonaqueous electrolyte secondary battery laminated separator in accordance with an embodiment of the present invention, and an anode which are laminated in this order. Note that constituent elements, other than the nonaqueous electrolyte secondary battery separator, of the nonaqueous electrolyte secondary battery are not limited to those described below.

The nonaqueous electrolyte secondary battery in accordance with an embodiment of the present invention is ordinarily configured so that a battery element is enclosed in an exterior member, the battery element including (i) a structure in which the anode and the cathode face each other via the porous layer in accordance with an embodiment of the present invention or the nonaqueous electrolyte secondary battery laminated separator in accordance with an embodiment of the present invention and (ii) an electrolyte with which the structure is impregnated. The nonaqueous electrolyte secondary battery is preferably a secondary battery including a nonaqueous electrolyte, and is particularly preferably a lithium ion secondary battery. Note that the doping means storage, support, absorption, or insertion, and means a phenomenon in which lithium ions enter an active material of an electrode (e.g., a cathode). In a case where the electrode is in a form of a sheet, a thickness of such an electrode is ordinarily is in the order of 5 μm to 1000 μm, and more preferably in the order of 10 μm to 200 μm.

A nonaqueous electrolyte secondary battery member in accordance with an embodiment of the present invention and a nonaqueous electrolyte secondary battery in accordance with an embodiment of the present invention each include a nonaqueous electrolyte secondary battery insulating porous layer in accordance with an embodiment of the present invention or a nonaqueous electrolyte secondary battery laminated separator in accordance with an embodiment of the present invention, and thus yields the effect of allowing heat resistance to be maintained in a favorable range, allowing air permeability, whose changes cause changes in battery characteristic correspondingly, to be maintained in a favorable range, and providing excellent productivity of battery production.

<Cathode>

A cathode included in the nonaqueous electrolyte secondary battery member in accordance with an embodiment of the present invention or included in the nonaqueous electrolyte secondary battery in accordance with an embodiment of the present invention is not limited to any particular one, provided that the cathode is one that is typically used as a cathode of a nonaqueous electrolyte secondary battery. Examples of the cathode encompass a cathode sheet having a structure in which an active material layer including a cathode active material and a binder resin (binding agent) is formed on a current collector. Ordinarily, the active material layer further includes an electrically conductive agent.

The cathode active material is, for example, a material capable of being doped with and dedoped of lithium ions. Specific examples of such a material encompass a lithium complex oxide containing at least one transition metal such as V, Mn, Fe, Co, or Ni.

Among such lithium complex oxides, (i) a lithium complex oxide having an α-NaFeO$_2$ structure such as lithium nickelate and lithium cobaltate and (ii) a lithium complex oxide having a spinel structure such as lithium manganese spinel are preferable because such lithium complex oxides have a high average discharge potential. The lithium complex oxide containing the at least one transition metal may further contain any of various metallic elements, and is more preferably complex lithium nickelate.

Further, the complex lithium nickelate particularly preferably contains at least one metallic element selected from the group consisting of Ti, Zr, Ce, Y, V, Cr, Mn, Fe, Co, Cu, Ag, Mg, Al, Ga, In, and Sn at a proportion of 0.1 mol % to 20 mol % with respect to the sum of the number of moles of the at least one metallic element and the number of moles of Ni in the lithium nickelate. This is because such a complex lithium nickelate allows an excellent cycle characteristic in a case where it is used in a high-capacity battery. The active material particularly preferably contains Al or Mn, and contains Ni at a proportion of equal to or greater than 85%, further preferably equal to or greater than 90%. This is because a nonaqueous electrolyte secondary battery including a cathode containing such an active material has an excellent cycle characteristic in a case where the nonaqueous electrolyte secondary battery has a high capacity.

An average particle diameter of particles by which the cathode active material is constituted is preferably not less than 1 μm to not more than 20 μm, and more preferably not less than 5 μm to not more than 10 μm.

Examples of the electrically conductive agent encompass carbonaceous materials such as natural graphite, artificial graphite, cokes, carbon black, pyrolytic carbons, carbon fiber, and a fired product of an organic polymer compound. It is possible to use (i) only one kind of the above electrically conductive agents or (ii) two or more kinds of the above electrically conductive agents in combination.

A weight ratio between a content of the cathode active material and a content of the electrically conductive agent is, for example, 100:0.1 to 100:30, preferably 100:0.5 to 100:10, and more preferably 100:1 to 100:3.

Examples of the binding agent encompass thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoropropylene-tetrafluoroethylene copolymer, a thermoplastic polyimide, polyethylene, polypropylene, carboxymethyl cellulose or its ammonium salt or alkali metal salt, and hydroxyethyl cellulose. The binding agent functions also as a thickening agent.

A weight ratio between a content of the cathode active material and a content of the binding agent is, for example, 100:0.1 to 100:10, and preferably 100:0.5 to 100:6.

Examples of the cathode current collector encompass electric conductors such as Al, Ni, and stainless steel. Among these, Al is preferable because Al is easily processed into a thin film and is inexpensive.

Examples of a method of producing the cathode sheet encompass: a method in which a cathode active material, an electrically conductive agent, and a binding agent are pressure-molded on a cathode current collector; and a method in which (i) a cathode active material, an electrically conductive agent, and a binding agent are formed into a paste with the use of a suitable organic solvent, (ii) a cathode current collector is coated with the paste, and then (iii) the paste is dried and then pressured so that the paste is firmly fixed to the cathode current collector.

<Anode>

An anode included in the nonaqueous electrolyte secondary battery member in accordance with an embodiment of the present invention or included in the nonaqueous electrolyte secondary battery in accordance with an embodiment of the present invention is not limited to any particular one, provided that the anode is a one that is typically used as an anode of a nonaqueous electrolyte secondary battery. Examples of the anode encompass an anode sheet having a structure in which an active material layer including an anode active material and a binder resin (binding agent) is formed on a current collector. Ordinarily, the active material layer further includes an electrically conductive agent.

Examples of the anode active material encompass (i) a material capable of being doped with and dedoped of lithium ions, (ii) lithium metal, and (iii) lithium alloy. Examples of such a material encompass carbonaceous materials. Examples of the carbonaceous materials encompass natural graphite, artificial graphite, cokes, carbon black, and pyrolytic carbon.

Examples of the anode current collector encompass Cu, Ni, and stainless steel, among which Cu is preferable because Cu is not easily alloyed with lithium in the case of a lithium ion secondary battery in particular and is easily processed into a thin film.

Examples of a method of producing the anode sheet encompass: a method in which an anode active material is pressure-molded on an anode current collector; and a method in which (i) an anode active material is formed into a paste with the use of a suitable organic solvent, (ii) an anode current collector is coated with the paste, and then (iii) the paste is dried and then pressured so that the paste is firmly fixed to the anode current collector. The paste preferably contains the electrically conductive agent and the binding agent.

<Nonaqueous Electrolyte>

A nonaqueous electrolyte in a nonaqueous electrolyte secondary battery in accordance with an embodiment of the present invention is not limited to any particular one, provided that the nonaqueous electrolyte is one that is typically used for a nonaqueous electrolyte secondary battery. The nonaqueous electrolyte can be one prepared by dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use (i) only one kind of the above lithium salts or (ii) two or more kinds of the above lithium salts in combination.

Examples of the organic solvent to be contained in the nonaqueous electrolyte encompass carbonates, ethers, esters, nitriles, amides, carbamates, a sulfur-containing compound, and a fluorine-containing organic solvent obtained by introducing a fluorine group into any of these organic solvents. It is possible to use (i) only one kind of the above organic solvents or (ii) two or more kinds of the above organic solvents in combination.

<Nonaqueous Electrolyte Secondary Battery Member Production Method and Nonaqueous Electrolyte Secondary Battery Production Method>

An nonaqueous electrolyte secondary battery member in accordance with an embodiment of the present invention can be produced by, for example, arranging the above cathode, a porous layer in accordance with an embodiment of the present invention or a nonaqueous electrolyte secondary battery laminated separator in accordance with an embodiment of the present invention, and an anode in this order.

A nonaqueous electrolyte secondary battery in accordance with an embodiment of the present invention can be produced by, for example, (i) forming a nonaqueous electrolyte secondary battery member by the method described above, (ii) placing the nonaqueous electrolyte secondary battery member in a container which is to serve as a housing of the nonaqueous electrolyte secondary battery, (iii) filling the container with a nonaqueous electrolyte, and then (iv) hermetically sealing the container under reduced pressure.

EXAMPLES

[Measuring Method]

Physical property values of nonaqueous electrolyte secondary battery laminated separators and porous layers produced in Examples 1 to 3 and Comparative Examples 1 and 2 were measured as follows.

<Measurement of Thickness>

In Examples 1 to 3 and Comparative Examples 1 and 2, thicknesses of the nonaqueous electrolyte secondary battery laminated separators and the polyolefin porous films were each measured in conformity with the JIS standard (K 7130-1992) with use of a high-precision digital length measuring machine manufactured by Mitutoyo Corporation, and thicknesses of the porous layers were each calculated based on the following equation (1):

$$\text{Thickness [µm] of porous layer} = (\text{Thickness [µm] of laminated separator}) - (\text{Thickness [µm] of polyolefin porous film}) \quad \text{Equation (1)}.$$

<Measurement of Porosity of Porous Layer>

(Weight Per Unit Area)

In Examples 1 to 3 and Comparative Examples 1 and 2, a square with one side 8 cm in length was cut off, as a sample, from each of the polyolefin porous films, and a weight $W_1$ (g) of the sample was measured. Further, a square with one side 8 cm in length was cut off, as a sample, from each of the nonaqueous electrolyte secondary battery laminated separators, and a weight $W_2$ (g) of the sample was measured. Then, a weight per unit area of each of the nonaqueous electrolyte secondary battery insulating porous layers was calculated based on the following equation (2):

$$\text{Weight per unit area } (g/m^2) = (W_2 - W_1)/(0.08 \times 0.08) \quad \text{Equation (2)}.$$

From the thickness [µm] and weight per unit area [g/m²] of the porous layer and the true density [g/m³] of the porous layer, which had been calculated and measured by the above methods, the porosity of the porous layer was calculated based on the following equation (3):

$$\text{Porosity of porous layer [\%]} = [1 - (\text{weight per unit area } [g/m^2] \text{ of porous layer})/\{(\text{thickness } [\mu m] \text{ of porous layer}) \times 10^{-6} \times (\text{true density } [g/m^3] \text{ of porous layer})\}] \times 100 \quad \text{Equation (3)}$$

<Measurement of Peeling Strength>

A peeling strength of each of the nonaqueous electrolyte secondary battery laminated separators produced in Examples 1 to 3 and Comparative Examples 1 and 2 when press-bonded to an electrode (cathode) at 25° C. through two one-minute 30 kN applications was measured by the following method.

<Cathode Preparing Step>

92 parts by weight of a cathode active material (CELL-SEED C-10N [produced by Nippon Chemical Industrial Co., Ltd.], $LiCoO_2$, average particle size: 10 µm, true specific gravity: 4.8 g/cm³), 2.7 parts by weight of an electrically conductive agent (acetylene black [produced by Denki Kagaku Kogyo Kabushiki Kaisha], true specific gravity: 2.2 g/cm³), 4.55 parts by weight of a binder 1 (PTFE31-JR [produced by Du Pont-Mitsui Fluorochemicals Co., Ltd.], true specific gravity: 2.2 g/cm³), and 0.75 parts by weight of a binder 2 (Serogen 4H [produced by Dai-Ichi Kogyo Seiyaku Co., Ltd.], true specific gravity: 1.4 g/cm³) were weighed out. A certain amount of water was put into a kneader, and the binder 2 was added and dissolved in the water. Then, the cathode active material, the electrically conductive agent, and the binder 1 were added, and the ingredients were kneaded. Next, water was added again so that the viscosity would be 2700±1000 cp. This prepared a cathode mix. This cathode mix was applied to a portion of each of both surfaces of an aluminum foil having a thickness of 20 µm, having no void, and serving as a cathode current collector sheet. The cathode mix applied was then dried. After that, the resulting product was rolled with use of a roller press until the coated film had a thickness of 140 μm (apparent density of 3.5 g/cm³). This produced a cathode having a width of 54 mm.

(Press-Bonding Step)

The cathode, which corresponds to the electrode 4, and each of the nonaqueous electrolyte secondary battery laminated separators, which correspond to the measurement sample 3, produced in Examples and Comparative Examples were press-bonded by the method illustrated in FIG. 1.

The electrode 4 and the measurement sample 3 were each cut into a rectangular piece of 25 mm×80 mm. Then, a porous layer-side surface of the measurement sample 3 is superposed with one surface of the electrode 4, and the electrode 4 and the measurement sample 3 were press-bonded at 25° C. through two one-minute 30 kN applications with use of a tabletop press machine (manufactured by Tester Sangyo Co., Ltd.; Tabletop Test Press SA-303). Specifically, with use of the tabletop press machines 1a and 1b, one-minute application of a force of 30 kN was carried out onto the electrode 4 and the measurement sample 3 (first pressure application), the force was then removed temporarily, and immediately thereafter, another one-minute application of a force of 30 kN was carried out onto different places of the electrode 4 and the measurement sample 3 (second pressure application). As a result, a secondary battery member having the electrode 4 and the measurement sample 3 arranged in this order was obtained. Note that the press-bonding was performed in a state in which the polyethylene terephthalate (PET) film 2 was provided between the tabletop press machine 1a and the measurement sample 3, and the PET film 5 was provided between the tabletop press machine 1b and the electrode 4.

(Peeling Strength Measuring Step)

The peeling strength was measured by a method illustrated in FIG. 2, wherein the cathode is an electrode 4, and each of the nonaqueous electrolyte secondary battery laminated separators produced in Examples and Comparative Examples is a measurement sample 3.

A peeling strength measurement sample was prepared by attaching, to an electrode 4 side of the obtained secondary battery member, a glass epoxy resin board 10 (manufactured by Hitachi Chemical Co., Ltd.; product name: MCL-E-67) with a double-faced adhesive tape 9 (manufactured by Nichiban Co., Ltd.; product name: NICETACK) and adhering, to a measurement sample 3 side of the obtained secondary battery member, a mending tape 7 (manufactured by 3M Japan Limited). Next, the peeling strength measurement sample was placed on a Compact Table-Top Universal Tester (EZ Test EZ-L manufactured by SHIMADZU CORPORATION) at jig fixing areas 6 and 8. The Compact Table-Top Universal Tester was used to measure the magnitude of a force required to peel the measurement sample 3 and the electrode 4 away from each other when the mending tape 7 was peeled off in a lengthwise direction at a testing rate of 500 mm/min in a thickness direction, and a measured value of the magnitude of the force was divided by a width (25 mm) of the measurement sample 3 to obtain a value of peeling strength (N/m). The measurement was carried out under the following conditions: load cell of 50 N, test length (length of the measurement sample 3) of 80 mm, and test width (width of the measurement sample 3) of 25 mm.

<Measurement of Air Permeability>

Air permeability (Gurley value) of each of the respective nonaqueous electrolyte secondary battery laminated separators produced in Examples 1 to 3 and Comparative Examples 1 and 2 was measured in conformity with JIS P 8117, by use of a digital timer Gurley Type Densometer manufactured by Toyo Seiki Seisaku-sho, Ltd.

Example 1

<Synthesis of Thermoplastic Resin>

A wholly aromatic polyester serving as a thermoplastic resin was synthesized by a method provided below.

Into a reactor including a stirring apparatus, a torque meter, a nitrogen gas inlet tube, a thermometer, and a reflux condenser, 941 g (5.0 mol) of 2-hydroxy-6-naphthoic acid, 377.9 g (2.5 mol) of 4-hydroxyacetanilide, 415.3 g (2.5 mol) of isophthalic acid, and 867.8 g (8.5 mol) of acetic anhydride were introduced. Then, a gas inside the reactor was sufficiently replaced with a nitrogen gas, and then a temperature inside the reactor was increased to 150° C. under a nitrogen gas airflow over a period of 15 minutes. Then, while the temperature (150° C.) was maintained, a reaction solution was refluxed for 3 hours.

Then, while an acetic acid distilled as a byproduct and an unreacted acetic anhydride were distilled away, the temperature was increased to 300° C. over a period of 170 minutes. At a time point at which an increase in torque was observed, a reaction was determined to have ended. Then, a resultant content was extracted. The resultant content was cooled to room temperature (25° C.), and then was crushed with the use of a crusher. Then, a wholly aromatic polyester powder having a relatively low molecular weight was obtained.

Furthermore, the wholly aromatic polyester powder was subjected to solid phase polymerization by being subjected to a heat treatment at 180° C. in a nitrogen atmosphere for 5 hours and is then subjected to a heat treatment at 250° C. in a nitrogen atmosphere for 5 hours.

The thus obtained wholly aromatic polyester having a relatively high molecular weight will be referred to as "aromatic polyester A". 40 g of the aromatic polyester A was added to 360 g of N-methyl-2-pyrrolidone (hereinafter referred to as "NMP"), and then a resultant mixture was heated at 100° C. for 2 hours, so that a 10% aromatic polyester A solution was obtained.

<Production of Nonaqueous Electrolyte Secondary Battery Laminated Separator>

The 10% aromatic polyester A solution, alumina fine particles (manufactured by Sumitomo Chemical Co., Ltd.; product name "AKP3000"), and a solvent (NMP) were mixed so that a mixed solution contains 50 parts by weight of the aromatic polyester A with respect to 50 parts by weight of the alumina fine particles. Next, the solvent (NMP) was added to the obtained mixed solution, and a resultant mixture was adjusted so that the mixture had a solid content concentration (concentration of alumina fine particles and aromatic polyester A) of 6% by weight. As a result, a dispersion liquid was obtained.

Then, the dispersion liquid thus obtained was stirred and mixed at room temperature (25° C.) at 10000 rpm for 3 minutes by use of a homogenizer (manufactured by IKA; product name "T18 digital ULTRA TURRAX"), and was then dispersed twice at 50 MPa by use of a high-pressure dispersing machine (manufactured by Sanwa Engineering Ltd.; product name: "Desktop Homogenizer"), so that a coating solution was obtained.

The coating solution thus obtained was applied onto a polyethylene porous film (having a thickness of 16 μm and a porosity of 54%), serving as a polyolefin porous film, by a doctor blade method so that a solid content of the coating solution weighed 8.9 g per square meter. An applied object thus obtained, that is, a laminated body was placed, for 1 minute, in a humidifying oven having a relative humidity of 80% at 60° C., was washed with the use of ion exchange water, and was then dried with the use of an oven at 80° C., so that a nonaqueous electrolyte secondary battery laminated separator was obtained.

Example 2

<Synthesis of Thermoplastic Resin>

A 10% aromatic polyester A solution was prepared by a method similar to the method described in Example 1.

An aramid resin serving as a thermoplastic resin was synthesized by a method provided below with the use of a 5-liter separable flask having a stirring blade, a thermometer, a nitrogen incurrent canal, and a powder addition port.

The separable flask was sufficiently dried, and then 4200 g of NMP was introduced into the separable flask. Then, 272.65 g of calcium chloride, which had been dried at 200° C. for 2 hours, was added, and then a temperature inside the separable flask was increased to 100° C. After the calcium chloride was completely dissolved, the temperature inside the flask was returned to room temperature (25° C.), and then 132.91 g of paraphenylenediamine (hereinafter abbreviated as "PPD") was added. Then, the PPD was completely dissolved, so that a solution was obtained. While a temperature of the solution was maintained at 20±2° C., 243.32 g of a terephthalic acid dichloride (hereinafter abbreviated as "TPC") was added, to the solution, in ten separate portions at approximately 5-minute intervals. Then, while a temperature of the resultant solution was maintained at 20±2° C., the solution was matured for 1 hour. Then, the solution was stirred under reduced pressure for 30 minutes to eliminate air bubbles, so that a 6% aramid resin solution was obtained.

<Production of Nonaqueous Electrolyte Secondary Battery Laminated Separator>

The 10% aromatic polyester A solution, the 6% aramid resin solution, and the solvent (NMP) were mixed so that a mixed solution contains 50 parts by weight of the aramid resin with respect to 50 parts by weight of the aromatic polyester A. The solvent (NMP) was added to the obtained mixed solution, and a resultant mixture was adjusted so that the mixture had a solid content concentration (concentration of aromatic polyester A and aramid resin) of 6% by weight. As a result, a dispersion liquid was obtained. Then, a nonaqueous electrolyte secondary battery laminated separator was obtained by a method similar to the method described in Example 1 except that the dispersion liquid was used to be applied so that a solid content of the coating solution weighed 3.2 g per square meter.

Example 3

<Synthesis of Thermoplastic Resin>

A wholly aromatic polyester serving as a thermoplastic resin was synthesized by a method provided below.

A wholly aromatic polyester was obtained by a method similar to the method described in Example 1 except that the following ingredients: 248.6 g (1.8 mol) of 4-hydroxybenzoic acid; 468.6 g (3.1 mol) of 4-hydroxyacetanilide; 681.1 g (4.1 mol) of isophthalic acid; 110.1 g (1.0 mol) of hydrochinone; and 806.5 g (7.90 mol) of acetic anhydride were introduced. The obtained wholly aromatic polyester will be referred to as "aromatic polyester B". Thereafter, a 20% aromatic polyester B solution was obtained by a method similar to the method described in Example 1.

Further, a 6% aramid resin solution was obtained by a method similar to the method described in Example 2.

<Production of Nonaqueous Electrolyte Secondary Battery Laminated Separator>

The 20% aromatic polyester B solution, the 6% aramid resin solution, alumina fine particles (manufactured by Sumitomo Chemical Co., Ltd.; product name "AKP3000"), fumed alumina (manufactured by Evonik Industries AG; product name "ALC"), and a solvent (NMP) were mixed so that a mixed solution contains 15.5 parts by weight of the aramid resin, 37.5 parts by weight of the alumina fine particles, and 37.5 parts by weight of the fumed alumina with respect to 9.5 parts by weight of the aromatic polyester B. Then the solvent (NMP) was added to the obtained mixed solution, and a resultant mixture was adjusted so that the mixture had a solid content concentration (concentration of aromatic polyester B, aramid resin, alumina fine particles, and fumed alumina) of 10% by weight. As a result, a dispersion liquid was obtained. Then, a nonaqueous electrolyte secondary battery laminated separator was obtained by a method similar to the method described in Example 1 except that the dispersion liquid was used to be applied onto a polyethylene porous film (having a thickness of 11 μm and a porosity of 44%), serving as a polyolefin porous film, by a doctor blade method so that a solid content of the coating solution weighed 2.0 g per square meter.

Comparative Example 1

<Production of Nonaqueous Electrolyte Secondary Battery Laminated Separator>

To a mixture containing 100 parts by mass of alumina fine particles (manufactured by Sumitomo Chemical Co., Ltd.; product name "AKP3000") and 3 parts by mass of carboxymethyl cellulose (manufactured by Daicel FineChem Ltd.; product number: 1110), water was added so that a resultant mixture was obtained with a solid content of 29% by weight. The mixture thus obtained was stirred and mixed twice at 2000 rpm for 30 seconds at room temperature (25° C.) with use of a planetary centrifugal mixer "AWATORI RENTARO" (manufactured by Thinky Corporation; registered trademark), so that a stirred mixture was obtained. To the stirred mixture thus obtained, 14 parts by mass of isopropyl alcohol was added, so that a homogeneous slurry having a solid content of 28% by weight was obtained as a coating solution. The coating solution thus obtained was applied onto a polyethylene porous film (having a thickness of 16 μm and a porosity of 54%), serving as a polyolefin porous film, by a doctor blade method so that a solid content of the coating solution weighed 6.0 g per square meter. An applied object thus obtained, that is, a laminated body was dried at 65° C. for 5 minutes, so that a nonaqueous electrolyte secondary battery laminated separator was obtained.

Comparative Example 2

<Synthesis of Aramid Resin>

Into a 5-liter (l) separable flask having a stirring blade, a thermometer, a nitrogen incurrent canal, and a powder addition port, 222 g of methaphenylenediamine and 3300 g of NMP were introduced. Then, a resultant mixture was stirred and dissolved, so that a methaphenylenediamine solution was obtained. Then, a solution was obtained by dissolving, into 1000 g of NMP, 419 g of isophthalic acid chloride which had been melted by being heated to 70° C. Then, the solution thus obtained was dropped onto the methaphenylenediamine solution, and then a resultant mixture was reacted at 23° C. for 60 minutes, so that a 10% aramid resin solution was obtained. The aramid resin solution thus obtained was dried under reduced pressure, so that an aramid resin solid was obtained.

<Production of Nonaqueous Electrolyte Secondary Battery Laminated Separator>

A mixed solution was obtained by mixing the aramid resin solid, alumina fine particles (manufactured by Sumitomo Chemical Co., Ltd.; product name "AKP3000"), and a solvent (a mixed solvent containing 40 parts by weight of tripropylene glycol with respect to 60 parts by weight of dimethylacetamide) so that the mixed solution contains 30 parts by weight of the aramid resin with respect to 70 parts by weight of the alumina fine particles. Thereafter, to the mixed solution thus obtained, the solvent was added to adjust so that a solid content concentration (alumina fine particles+aramid resin) of a resultant mixed solution was 20% by weight. As a result, a dispersion liquid was obtained. Then, a coating solution was obtained by a method similar to the method described in Example 1 except that the dispersion liquid was used.

The coating solution thus obtained was applied onto a polyethylene porous film (having a thickness of 16 μm and a porosity of 54%), serving as a polyolefin porous film, by a doctor blade method so that a solid content of the coating solution weighed 9.0 g per square meter. An applied object thus obtained, that is, a laminated body was put in a coagulation tank containing water, dimethylacetamide, and tripropylene glycol in a ratio of 50:30:20 at 40° C. for 1 minute, and thereafter, the laminated body was washed with ion exchange water and was then dried with the use of an oven at 80° C., so that a nonaqueous electrolyte secondary battery laminated separator was obtained.

CONCLUSION

Physical property values of the nonaqueous electrolyte secondary battery laminated separators produced in Examples 1 to 3 and Comparative Examples 1 and 2 are shown in Table 1 below.

TABLE 1

| | Thickness of porous layer [μm] | Porosity of porous layer [%] | Air permeability [s/100 ml] | Peeling strength [N/m] |
|---|---|---|---|---|
| Example 1 | 16.6 | 74 | 153 | 1.6 |
| Example 2 | 4.0 | 43 | 208 | 0.6 |
| Example 3 | 2.7 | 71 | 139 | 0.2 |
| Comparative Example 1 | 4.9 | 53 | 318 | 0.0 |
| Comparative Example 2 | 6.8 | 46 | 484 | 2.1 |

Table 1 reveals that the nonaqueous electrolyte secondary battery laminated separators produced in Examples 1 to 3 and having the peeling strength in a range of above 0 N/m to 2.0 N/m exhibit more favorable air permeability in comparison with the nonaqueous electrolyte secondary battery laminated separators produced in Comparative Examples 1 and 2 and having the peeling strength outside the above range, and allow for improvement in battery characteristic.

It was also revealed that the nonaqueous electrolyte secondary battery laminated separators produced in Examples 1 to 3 provide good adhesion with electrodes at room temperature (25° C.) even in a dry state and are excellent in battery characteristic.

In view of the above, it was revealed that the nonaqueous electrolyte secondary battery laminated separators produced in Examples 1 to 3 are excellent in productivity of battery production and allow for improvement in battery characteristic.

INDUSTRIAL APPLICABILITY

A nonaqueous electrolyte secondary battery insulating porous layer in accordance with an embodiment of the present invention provides excellent productivity of battery production and allows for improvement in battery characteristic (resistance). Therefore, the nonaqueous electrolyte secondary battery insulating porous layer in accordance with an embodiment of the present invention is useful as a member of a nonaqueous electrolyte secondary battery.

REFERENCE SIGNS LIST

1a Tabletop press machine
1b Tabletop press machine
2 Polyethylene terephthalate (PET) film
3 Measurement sample
4 Electrode
5 Polyethylene terephthalate (PET) film
6 Jig fixing area
7 Mending tape
8 Jig fixing area
9 Double-faced adhesive tape
10 Glass epoxy resin board

The invention claimed is:

1. A nonaqueous electrolyte secondary battery insulating porous layer for covering an entire area of at least one surface of a porous base material included in a nonaqueous electrolyte secondary battery laminated separator,
wherein:
the nonaqueous electrolyte secondary battery insulating porous layer includes a thermoplastic resin, has a porosity of 25% to 80%, and has a peeling strength of above 0 N/m to 2.0 N/m when press-bonded to a nonaqueous electrolyte secondary battery electrode at 25° C. through two one-minute 30 kN applications, the nonaqueous electrolyte secondary battery electrode containing an electrode active material, an electrically conductive agent, and a binding agent in a mass fraction of 92:2.7:5.3; and
the thermoplastic resin is at least one selected from the group consisting of wholly aromatic polyamide, wholly aromatic polyimide, wholly aromatic polyester, wholly aromatic polycarbonate, wholly aromatic polysulfone, and wholly aromatic polyether;
wherein the insulating porous layer has a thickness of 0.5 μm to 15 μm on each surface of the porous base material covered by the insulating porous layer.

2. The nonaqueous electrolyte secondary battery insulating porous layer as set forth in claim 1, wherein the peeling strength is 0.5 NM to 2.0 N/m.

3. A nonaqueous electrolyte secondary battery laminated separator comprising:
a nonaqueous electrolyte secondary battery insulating porous layer recited in claim 1; and
a polyolefin porous film.

4. A nonaqueous electrolyte secondary battery member comprising:
a cathode;
a nonaqueous electrolyte secondary battery insulating porous layer recited in claim 1; and
an anode, the cathode, the nonaqueous electrolyte secondary battery insulating porous layer, and the anode being arranged in this order.

5. A nonaqueous electrolyte secondary battery comprising:
a nonaqueous electrolyte secondary battery insulating porous layer recited in claim 1.

6. A nonaqueous electrolyte secondary battery member comprising:
a cathode;
a nonaqueous electrolyte secondary battery laminated separator recited in claim 3; and
an anode,
the cathode, the nonaqueous electrolyte secondary battery laminated separator, and the anode being arranged in this order.

7. A nonaqueous electrolyte secondary battery comprising:
a nonaqueous electrolyte secondary battery laminated separator recited in claim 3.

8. The nonaqueous electrolyte secondary battery insulating porous layer as set forth in claim 1, wherein the thermoplastic resin is wholly aromatic polyamide.

* * * * *